Patented Sept. 21, 1943

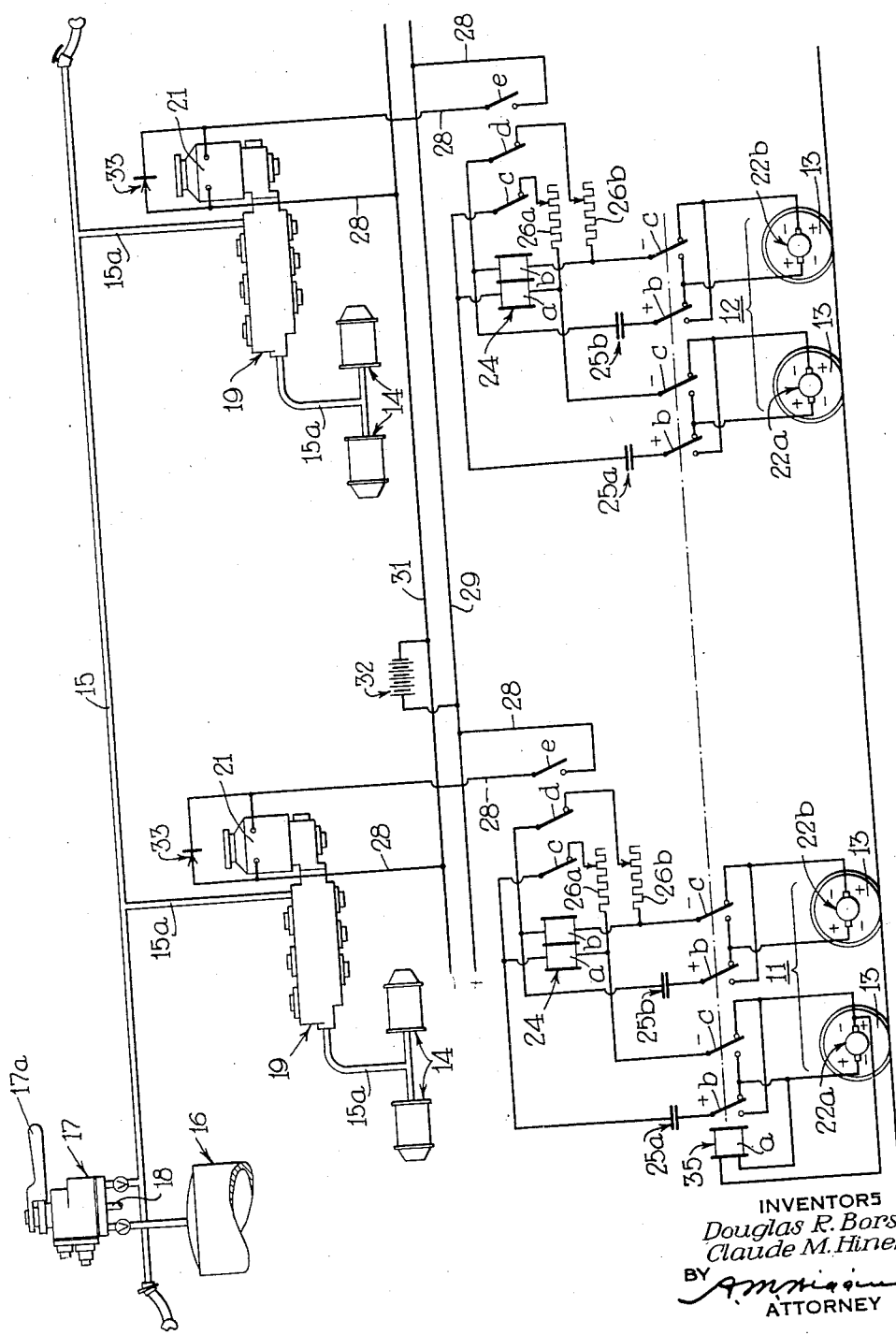

2,329,762

UNITED STATES PATENT OFFICE 2,329,762

VEHICLE BRAKE CONTROL SYSTEM

Douglas R. Borst, Pitcairn, and Claude M. Hines, Pittsburgh, Pa., assignors to The Westinghouse Air Brake Company, Wilmerding, Pa., a corporation of Pennsylvania Application February 25, 1942, Serial No. 432,188

11 Claims. (Cl. 303—21)

This invention relates to brake control systems for vehicles, such as railway cars and trains, and has particular relation to brake control systems including apparatus for detecting the slipping condition of individual wheels or wheel units of the vehicle and for so controlling the brakes associated with those wheels as to prevent sliding thereof.

The term "slipping condition" as applied herein to a vehicle wheel refers to the rotation of the wheel at a speed less than a speed corresponding to vehicle speed at a given instant, due to the application of the brakes to a degree sufficient to exceed the limit of adhesion between the wheel and the road surface or rail. When a wheel begins to slip, it decelerates at an abnormally rapid rate and unless the degree of application of the brakes applied to the wheel is instantly and rapidly reduced the wheel reduces in speed to a locked condition and slides. The term "sliding" or "sliding condition" is thus employed herein to designate the locked or non-rotative condition of the vehicle wheel at a time that the vehicle is in motion. It is obviously desirable to prevent the sliding of vehicle wheels in order to prevent the development of flat spots on the wheels necessitating repair or replacement of the wheel.

A vehicle wheel, such as a railway car wheel, cannot greatly exceed a certain rate of rotative deceleration, such as a rate corresponding to a rate of retardation of the car or train of four or five miles per hour per second, without slipping. If, therefore, the wheel rotatively decelerates at a rate in excess of a rate corresponding to ten miles per hour per second it is a positive indication that the wheel is in a slipping condition. It is thus possible to detect a slipping condition of the wheel at its inception by a means responsive to the rate of deceleration of the wheel.

Various devices and apparatus responsive to the rate of rotative deceleration of a vehicle wheel have previously been proposed and employed for the purpose of detecting the slipping condition of a vehicle wheel for a desired purpose, such as the rapid reduction in the degree of application of the brakes associated with the wheel to prevent sliding of the wheel.

It is an object of our invention to provide a vehicle brake control system including a novel arrangement for detecting the slipping condition of a plurality of different wheel units and controlling the brakes associated with these wheel units in a manner to prevent the sliding of the wheels.

More specifically, it is an object of our invention to provide a vehicle brake control system of the type indicated in the foregoing object and further characterized by a control relay having a plurality of separate windings each of which is energized in accordance with the rate of deceleration of a corresponding wheel unit, the windings cooperating in a manner to effect an operative response of the relay only when one or more of the wheel units begins to slip.

Another object of our invention is to provide a vehicle brake control system of the type indicated in the foregoing objects whereby the reduction of the degree of application of the brakes associated with the slipping wheels is initiated only when the wheels exceed a certain high rate of rotative deceleration and is continued thereafter as long as the wheels exceed a certain low rate of deceleration.

It is another object of our invention to provide a vehicle brake control system of the type indicated in the foregoing objects and characterized further in that the restoration or reapplication of the brakes occurring in response to the drop-out of the control relay is automatically restricted to a relatively low rate.

The above objects, and other objects of our invention which will be made apparent hereinafter, are attained by means of the simplified brake control system diagrammatically shown in the single figure of the accompanying drawing.

Description

Referring to the drawing, the brake control equipment shown is of the familiar straight-air type of fluid pressure brake control apparatus effective to control the brakes associated with two wheel trucks 11 and 12 of a single car. Each of the wheel trucks comprises two wheel units, each unit having a pair of wheels 13 fixed at opposite ends of a connecting axle. Only one wheel of each wheel unit is visible in the drawing. Although employed herein to designate a pair of axle-connected wheels, the term "wheel unit" may refer also to a single wheel or any other number of connected wheels.

The brakes associated with the wheels 13 may be of any suitable type, such as the conventional clasp-arranged shoes engaging the rim of the wheels and operative through the medium of brake levers or rigging in response to the supply of fluid under pressure to and the release of fluid under pressure from brake cylinders 14. Although any number of brake cylinders may be provided, one brake cylinder is illustratively shown for each wheel unit in substantially vertical alignment above the corresponding unit.

The fluid pressure brake control apparatus shown comprises a train pipe, hereinafter referred to as the control pipe 15, a source of fluid under pressure hereinafter referred to as the main reservoir 16, and a brake valve 17 of the self-lapping type.

The brake valve 17 is of the well-known type described in detail and claimed in Patent 2,042,112 of Ewing K. Lynn and Rankin J. Bush and is therefore shown only in outline form and will be here but briefly described.

Brake valve 17 comprises suitable self-lapping valve mechanism having a rotary operating shaft to which an operating handle 17a is fixed. In the normal or brake release position of the brake valve handle 17a, fluid under pressure is exhausted from the control pipe 15 to atmosphere through an exhaust port and pipe 18 at the brake valve. Upon the displacement of the brake valve handle in a horizontal plane out of its brake release position into its so-called application zone, the exhaust communication just mentioned is closed and a supply communication is established through which fluid under pressure is supplied from the main reservoir 16 to the control pipe 15. The nature of the self-lapping valve mechanism of the brake valve 17 is such that the pressure established in the control pipe 15 is substantially proportional to the degree of displacement of the brake valve handle out of its brake release position. The valve mechanism of the brake valve 17, moreover, possesses a pressure-maintaining feature for maintaining a pressure in the control pipe 15 corresponding to the position of the brake valve handle in the event that the pressure in the control pipe tends to reduce for any reason, such as leakage.

The brake cylinders 14 for each of the wheel trucks are connected by corresponding branch pipes 15a to the control pipe 15, each of the branch pipes 15a having a control valve mechanism 19 interposed therein for a purpose hereinafter to be described.

Control valve mechanism 19 is of the type shown and described in detail in the copending application Serial No. 381,083 of Joseph C. McCune, filed February 28, 1941, and now Patent 2,283,608, assigned to the assignee of the present application. Since reference may be had to the patent just referred to for details of construction and operation of control valve mechanism 19 it is shown in outline form only herein and will be but briefly described.

Essentially, the control valve mechanism 19 comprises pneumatically operated supply and release valves, under the control of a magnet valve having an electro-magnet winding or solenoid 21. Normally, when the magnet winding 21 is deenergized, the supply valve is in open position establishing communication through the corresponding branch pipe 15a from the control pipe 15 to the brake cylinders 14. At the same time the release valve is closed.

Upon energization of the magnet winding 21, the supply and release valves are substantially simultaneously operated to closed and opened positions, respectively, the supply valve cutting off the communication through the branch pipe 15a from the control pipe to the brake cylinders and the release valve opening an exhaust communication through which fluid under pressure is exhausted at a rapid rate from the brake cylinders 14.

Control valve mechanism 19 also includes a reapplication control device which is effective to restrict to a relatively slow rate the supply of fluid under pressure through the branch pipe 15a to the brake cylinders as long as a certain differential pressure such as five pounds per square inch exists between the pressure in the control pipe 15 and the pressure in the brake cylinders 14. The restriction of the re-supply of fluid under pressure to the brake cylinder to a slow rate is automatically effective as hereinafter described following the reduction in the degree of application of the brakes in response to slipping of the wheel and minimizes the possibility of the recurrence of wheel-slipping because a substantial pressure is not built-up in the brake cylinders until after the slipping wheels have been fully restored to vehicle speed.

In accordance with our present invention, there is further provided novel electric decelerometer apparatus for detecting the slipping condition of the wheels of each truck for the purpose of controlling the magnet winding 21 of the control valve mechanism 19.

Specifically, the electric decelerometer apparatus which we have provided for each wheel truck 11 and 12 comprises two generators 22a and 22b mounted in any suitable manner, as in the journal casing at the end of a wheel axle with the armature shaft of the generator coupled to the end of the axle in the manner indicated in the drawing, so that the armatures of the generators are driven in accordance with the rotational speed of the corresponding wheel units. The generators 22a and 22b may be of any suitable type, such as the permanent magnet field core type, so designed as to produce a voltage substantially proportional to the rotational speed of the corresponding wheel unit, the polarity of the voltage at the terminals of the generators reversing automatically upon reversal of rotation of the vehicle wheel.

In addition to the generators 22a and 22b, the electric decelerometer apparatus for each wheel truck 11 and 12 further comprises a so-called slip relay 24, two electrical condensers 25a and 25b and two adjustable resistors 26a and 26b.

Each of the slip relays 24 is of the so-called unidirectional type having two separate windings a and b respectively, two back contacts c and d and one front contact e. It will be understood that, in the usual manner, the term "back contact" refers to a contact which is in closed position when the armature of the relay is dropped-out and which are actuated to an open position upon pick-up of the armature of the relay. In a similar manner it will be understood that the term "front contact" refers to a contact which is in open position when the armature of the relay is dropped-out and which is actuated to a closed position in response to the pick-up of the relay armature.

As will be apparent from the drawing without specific description, the winding a of each slip relay 24 is connected in series circuit relation with the corresponding condenser 25a across the terminals of the corresponding axle-driven generator 22a, the resistor 26a being connected in shunt relation to the winding a by the back contact c of relay 24 in its dropped out or closed position. In a similar manner, it will be seen that the winding b of each slip relay 24 is connected in series relation with the corresponding condenser 25b across the terminals of the corresponding axle-driven generator 22b, resistor 26b being connected in shunt relation to the winding $b$ by back contact $d$ of relay 24 in its dropped-out or closed position.

For reasons which will be made apparent hereinafter, the connections to the terminals of the generators $22a$ and $22b$ of the several wheel trucks 11 and 12 are automatically reversed in response to a reversal in the direction of rotation of the vehicle wheels by suitable means, illustrated as a reversing relay 35 of the polarized type. The reversing relay 35 has a winding $a$ which is connected across the terminals of one of the axle-driven generators, for example the generator $22a$ of wheel truck 11, and a plurality of pairs of transfer or reversing contacts $b$ and $c$, one pair for each of the generators $22a$ and $22b$.

When the vehicle is traveling in a forward direction, the polarity of the voltage at the terminals of generator $22a$ is such as to energize the winding $a$ of reversing relay 35 in a direction to cause the contacts of the relay to assume and maintain the position in which they are shown. Upon reverse travel of the vehicle and a consequent reversal of polarity of the voltage at the terminals of generator $22a$, the winding $a$ of relay 35 is energized by the reversed current in a manner to actuate the contacts of the relay to the position opposite to that in which they are shown.

It will accordingly be apparent that notwithstanding a reversal of the polarity at the terminals of the axle-driven generators, due to the reversal of travel of the vehicle, a voltage of uniform polarity is impressed across each series-connected condenser $25a$ and winding $a$ of slip relay 24 as well as across each condenser $25b$ and winding $b$ of slip relay 24.

The front contact $e$ of each slip relay 24 is connected in series relation with the magnet winding 21 of the corresponding control valve mechanism 19 in a wire 28, one end of which is connected to a positive bus wire 29 and the other end of which is connected to a negative bus wire 31, the bus wires 29 and 31 being connected respectively to the positive and negative terminals of a suitable source of direct-current, such as a storage battery 32. Contact $e$ of each relay 24 accordingly controls energization and deenergization of the magnet winding 21 of the corresponding control valve mechanism 19.

An asymmetric device 33, which may be a halfway rectifier of either the dry disk or tube type, is connected in shunt relation to the magnet winding 21 of each of the control valve mechanisms 19 in well known manner for the purpose of dissipating the transient voltage induced in the winding 21 upon interruption of the energizing circuit for the winding to minimize or prevent arcing or pitting of the contact $e$ of relay 24.

When the vehicle wheels 13 accelerate rotatively in speed, the corresponding generators $22a$ and $22b$ supply a voltage which increases with the speed of the wheels, thereby causing current to be supplied to charge the corresponding condensers $25a$ and $25b$ which current flows through the corresponding windings $a$ and $b$ of the slip relay 24 in a corresponding direction. It will be apparent that the current supplied to charge the condensers will vary substantially in proportion to the rate of increase of the voltage supplied by the generator and therefore substantially in proportion to the rate of rotative acceleration of the vehicle wheels.

On the other hand, when the vehicle wheels 13 rotatively reduce in speed, the corresponding reduction of the voltage at the terminals of the generators $22a$ and $22b$ causes the condensers $25a$ and $25b$ to discharge current reversely in the circuit through the armature winding of the generators and the corresponding windings $a$ and $b$ of the relay 24, which current is substantially proportional to the rate of rotative deceleration of the wheels.

The character of the relay 24 and the connections of its windings $a$ and $b$ are such that current supplied to charge the condensers $25a$ and $25b$ flows in such a direction through the windings as to bias the armature of the relay and consequently the contacts of the relay toward their dropped-out position, or if they are already in their dropped-out position, maintain them more firmly in such position. On the other hand, the current discharged from the condensers flows through the windings $a$ and $b$ in such a direction as to cause pick-up of the armature of the relay and a consequent actuation of the contacts to their picked-up position when a sufficient number of ampere-turns is attained.

The number of turns in the separate windings $a$ and $b$ and the resistance thereof is such that the total number of ampere-turns of both windings produced in response to the maximum non-slipping rate of deceleration of the vehicle wheels is insufficient to cause pick-up of the contacts of the relay.

Whenever one or both of the wheel units of a given truck begin to slip, however, the rate of deceleration of the wheels is abnormally high and consequently the current discharged from the corresponding condenser is abnormally high. In such case, therefore, the total number of ampere-turns exceeds that required to cause pick-up of the contacts of the relay and they are accordingly actuated to their picked-up position.

Relay 24 may be picked-up at a lesser rate of deceleration of the wheels when both wheel units slip simultaneously compared to the rate of deceleration at which it picks up when only one wheel unit of a given truck slips. This is so because with one wheel unit decelerating at a normal or non-slipping rate, the current energizing the corresponding winding of the relay 24 is relatively low, so that the current through the other winding corresponding to the slipping wheel unit must be relatively higher in order to cause pick up of the relay than when the current in both windings is abnormally high due to the slipping of both wheel units. Thus, for example, relay 24 may be picked-up upon slipping of only one wheel unit when such slipping wheel unit decelerates at a rate in excess of ten miles per hour per second whereas when both wheel units slip simultaneously the relay may pick up when either one or both of the slipping wheel units exceeds a rate of rotative deceleration of seven miles per hour per second.

In any event, however, the relay 24 is not picked-up unless one or both of the wheel units begins to slip.

When the relay 24 picks-up, the resistors $26a$ and $26b$ are disconnected from shunt relation with the corresponding windings $a$ and $b$ of the relay 24 in response to actuation of the back contact $c$ and $d$ to their respective picked-up or open positions. The current through the respective windings $a$ and $b$ of the relay 24 is thus proportionately increased for a given rate of rotative deceleration of the corresponding wheel units. For example, when the relay 24 is picked-up, the current through the windings thereof may be increased thirty per cent for a given rate of rotative deceleration in effect at the time the relay is picked-up.

It is well known that due to the reduction in the reluctance of the magnetic path including the magnetic core of the relay and the movable armature when the armature of the relay is picked-up, the armature may be held picked-up by a lesser current than is required to cause pick-up operation thereof. Thus relays 24 may be so designed that the armature thereof will not drop-out, once it is picked-up, until the total number of ampere-turns effective is reduced to fifty per cent of that required to cause pick-up of the armature.

It will be apparent, therefore, that inherently the relays 24, remain picked-up after being once actuated to their picked-up position until such time as the rate of rotative deceleration of the wheel units reduces below a value somewhat lower than that required to cause pick-up of the relays.

In order to provide a greater difference between the rate of rotative deceleration of a wheel unit required to cause pick-up of the relay 24 and the rate below which drop-out of the relay occurs than that inherent in the relay itself, resistors 26a and 26b are provided. It will be apparent that due to the increase in the current energizing the respective windings a and b of the relay 24 resulting from the disconnection of the resistors 26a and 26b in response to pick-up of the relay, the amount of reduction in the rate of rotative deceleration of the wheel units which must be effected before drop-out of the relay 24 can occur is substantially greater than that due merely to the inherent characteristic of the relay itself.

It will thus be seen that by adjusting the resistance of the resistors 26a and 26b to any desired value, energization of the windings a and b of relay 24 may be correspondingly controlled so as to maintain the relay picked-up over any desired range in the rate of rotative deceleration of the vehicle wheels. Thus resistors 26a and 26b may be so adjusted in value that in the case where only one wheel unit slips, the relay 24 is picked-up when the slipping wheel exceeds a rate of rotative deceleration exceeding ten miles per hour per second and not restored to its dropped-out position until the slipping wheel unit decreases below, for example, a rate of rotative deceleration of two miles per hour per second. Similarly, when both of the wheel units slip simultaneously, the relay 24 may be picked-up when one or both of the wheel units exceeds a rate of rotative deceleration of seven miles per hour per second and not restored to its dropped-out position until the slipping wheels decrease below a certain low rate of rotative deceleration such as 2.5 miles per hour per second.

Operation

Let it be assumed that the car having the equipment shown in the drawing is traveling under power with the brake valve handle 17a in its brake release position, so that the brakes are released, and that the operator desires to bring the car to a stop. To do so, he first shuts off the propulsion power in the usual manner and then shifts the brake valve handle 17a out of its brake release position into its application zone an amount corresponding to the desired degree of brake application. The control pipe 15 is thus charged to a corresponding pressure as are the brake cylinders 14, to which fluid under pressure is supplied through the branch pipes 15a from the control pipe. The brakes are accordingly applied on the wheels to a degree corresponding to the pressure established in the brake cylinders.

As long as the wheels on the vehicle or car do not slip, no variation in the fluid pressure in the brake cylinders 14 occurs except in accordance with variations of the pressure in the control pipe effected by the operator. If however, when an application of the brakes is initiated or at any time during a brake application, one or more of the wheel units on the car begin to slip, a further operation occurs which will now be described.

Let it be assumed that when the brakes are applied, the right-hand wheel unit of wheel truck 11 begins to slip. Slip relay 24 for wheel truck 11 is thus picked-up and the front contact e of the relay is effective in its picked-up or closed position to effect energization of the magnet winding 21 of the control valve mechanism 19 for truck 11.

As previously explained, energization of the magnet winding 21 of the control valve mechanism 19 causes closure of communication through the branch pipe 15a to the brake cylinders 14 of wheel truck 11 and the venting of fluid under pressure from those brake cylinders.

The degree of application of the brakes associated with the two wheel units of wheel truck 11 is thus promptly and rapidly reduced. The rate of rotative deceleration of the slipping wheel unit thus promptly decreases to zero after which the wheel unit accelerates at an abnormally rapid rate back toward a speed corresponding to car speed.

The slip relay 24 is maintained picked-up for reasons previously explained, until the rate of rotative deceleration of the slipping wheel unit decreases below a low rate, such as two miles per hour per second, whereupon the slip relay is restored to its dropped-out position. The reduction of the pressure in the brake cylinders 14 is thus reduced continuously from the time that the relay 24 is picked-up until the time that the relay is restored to its dropped-out position. The amount of the reduction in brake cylinder pressure will vary with the initial pressure in the brake cylinder as well as the time that the relay 24 is picked-up. In any event, the interval of time that the relay 24 is picked-up is sufficiently short so as to permit only a partial reduction of the pressure in the brake cylinders and not a complete reduction of the pressure in the brake cylinders to atmospheric pressure. In other words, the arrangement is such as to produce a sufficient reduction of the pressure in the brake cylinders to cause the slipping wheels to be restored to vehicle speed without unnecessary reduction of the pressure in the brake cylinders involving needless consumption or waste of fluid under pressure.

As previously explained, the deenergization of the magnet winding 21 of the control valve mechanism 19 in response to the drop-out of the relay 24 not only terminates the reduction of the pressure in the brake cylinder but conditions the control valve mechanism to reestablish communication through the branch pipe 15a in such a manner that fluid under pressure is resupplied to the brake cylinders at a restricted rate. The pressure in the brake cylinders 14 on the truck having the wheel unit which slipped is accordingly built-up at a restricted rate.

As previously mentioned, the slipping wheels accelerate at an abnormally rapid rate back toward a speed corresponding to car speed in response to the reduction in the degree of application of the brakes effected by pick-up of the relay 24. Accordingly, the slipping wheels are restored fully to a speed corresponding to car speed before a substantial increase of the pressure in the brake cylinders can occur in response to the drop-out of the relay 24. As a matter of fact, the rate at which the pressure in the brake cylinders is restored may be so selected that a pressure corresponding to the pressure in the control pipe 15 is not attained in the brake cylinders for a considerable time after the slipping wheel unit has been restored to a speed corresponding to car speed.

The reapplication control device of the control valve mechanism 19 continues effective to restrict the rate of resupply of fluid under pressure to the brake cylinders 14 until brake cylinder pressure is built-up to less than five pounds per square inch pressure below the pressure in the control pipe and is then restored to its original condition permitting the supply of fluid under pressure from the control pipe 15 to the brake cylinders at the normal or more rapid rate.

The resupply of fluid under pressure from control pipe 15 to the brake cylinders 14 of the truck having the wheels which slipped tends to cause a reduction of the pressure in the control pipe. However, due to the pressure-maintaining feature of the brake valve 17, fluid under pressure is supplied automatically to the control pipe to maintain a pressure therein corresponding to the position of the brake valve handle and to compensate for the fluid under pressure supplied to the brake cylinders.

Upon the drop-out of the relay 24, the resistors 26a and 26b are reconnected into shunt relation with the corresponding windings a and b of the relay 24, thereby reconditioning the relay to be picked-up thereafter only in response to a slipping condition of either one or both of the wheel units of the corresponding truck.

Due to the fact that the pressure is increased in the brake cylinders 14 at a restricted rate by the control valve mechanism 19 following a wheel slip condition repeated slipping of the same wheel unit is unlikely. However, in the event that the wheels of a truck again begin to slip upon the restoration of an increased pressure in the brake cylinders following a previous slipping condition, the above operation is repeated so that at no time are the wheels permitted to reduce in speed to a locked condition and slide.

In the previously described operation, it was assumed that only one wheel unit of a truck began to slip when the brakes were applied. In the event that both wheel units of a given truck being to slip substantially simultaneously when the brakes are applied or at any time during a brake application, the slip relay 24 is similarly picked-up in response to the abnormal or slipping rate of rotative deceleration of the wheel units. As previously pointed out, however, the relay 24 will pick-up at a somewhat lower rate of rotative deceleration of the wheel units than in the case where only one wheel unit slips. The magnet winding 21 of the control valve mechanism 19 is in any event energized, as in the previous instance, to effect a reduction of the pressure in the brake cylinders and a subsequent restoration of the pressure therein at a restricted rate when the relay 24 is restored to its dropped-out position. As previously pointed out, the relay 24 may drop-out at a rate of wheel deceleration which is slightly higher than in the case of slipping of only one wheel unit. Thus although the range of decelartion rates over which the relay 24 is picked-up may be different in amount when both wheel units slip simultaneously as compared to when only one wheel unit slips, the interval of time that the relay 24 is picked-up is sufficient to cause such a reduction of the pressure in the brake cylinders as to insure the restoration of the slipping wheels back to a speed corresponding to car speed.

In the event that either one or both of the wheel units of wheel truck 12 begins to slip when the brakes are applied or during a brake application, the slip relay 24 associated with that truck is picked-up and the control valve mechanism 19 associated therewith operated to effect a rapid reduction of the pressure in the brake cylinders 14 for the wheel truck 12 in a manner similar to that described for wheel truck 11. Since the operation of the electric decelerometer apparatus and the brake control apparatus for wheel truck 12 is identical to that for wheel truck 11, such operation is not repeated in detail.

When the car comes to a complete stop the slip relays 24 are always restored to their dropped-out positions, if not previously restored thereto, because of the cessation of the supply of voltage from the axle-driven generators 22a and 22b. Consequently the control valve mechanisms 19 are always conditioned while the car is at a standstill for charging the brake cylinders 14 to the pressure established in the control pipe 14. Accordingly, it will be seen that when the car is stopped the brakes remain applied on all of the braked wheel units to a degree corresponding to the pressure established in the control pipe 15. Obviously the operator may vary the pressure in the control pipe 15 when the car is at a standstill to secure any desired degree of application of the brakes for holding the car on any grade encountered in service.

When the operator again desires to start the car he first releases the brakes merely by restoring the brake valve handle 17a to its brake release position. Fluid under pressure is accordingly exhausted by flow reversely from the brake cylinders through the control valve mechanism 19 to the control pipe 15 and thence to atmosphere through the exhaust port and pipe 18 at the brake valve. Upon the restoration of atmospheric pressure in the control pipe 15, the brakes are correspondingly completely released.

If the car travels in a reverse direction, the contacts of reversing relay 35 are actuated to their picked-up position, thereby reversing the connections to the terminals of the generators 22a and 22b. Thus, notwithstanding a reversal of polarity of the voltage at the terminals of the generators, the condensers are always subject to a charging voltage of uniform polarity so that the proper direction of flow of current through the windings a and b of slip relays 24 for picking-up the relay 24 occurs in response to deceleration of the vehicle wheels at a slipping rate.

It should be understood that while we have shown only the equipment for a single car, that a train of connected cars may be similarly equipped. In the case of a train of cars, it is preferable to control the pressure in the control pipe 15 in well-known manner by means of suitable magnet valves on each car the magnet valves being controlled electrically through train wires from a master controller located on one car, such as a locomotive, at the head of the train in order to secure simultaneous and uniform buildup and reduction of pressure throughout the entire length of the control pipe 15.

Having now described our invention, what we claim as new and desire to secure by Letters Patent, is:

1. In a vehicle brake control system, the combination of an electrical relay, means for causing pick-up of said relay only when a wheel unit of the vehicle rotatively decelerates at a rate exceeding a certain slipping rate, means associated with said relay effective in response to pick-up thereof for maintaining it picked-up until such time as the slipping wheel unit ceases to decelerate at a rate exceeding a second certain rate relatively low compared to the rate of deceleration required to cause pick-up of the relay, and brake control means controlled by said relay effective in response to pick-up of said relay to initiate a continued reduction in the degree of application of the brakes associated with said wheel unit and effective in response to the drop-out of said relay to initiate an increase in the degree of application of the brakes.

2. In a vehicle brake control system, the combination of an electrical relay, means for causing pick-up of said relay only when a wheel unit of the vehicle rotatively decelerates at a rate exceeding a certain slipping rate, means effective in response to pick-up of said relay for causing said relay to remain picked-up thereafter until such time as the said wheel unit ceases to decelerate at a rate exceeding a second certain rate relatively low compared to first said certain rate, and brake control means operative in response to the pick-up of said relay for initiating a continued reduction in the degree of application of the brakes associated with said wheel unit at a relatively rapid rate and effective in response to the drop-out of said relay to initiate an increase in the degree in the application of the brakes at a relatively restricted rate.

3. In a vehicle brake control system, the combination of an electrical relay, means operative in response to the rotative deceleration of any one of a plurality of wheel units of the vehicle at a rate exceeding a certain slipping rate for causing pick-up of said relay, means effective in response to the pick-up of said relay for maintaining it picked-up thereafter as long as any one of said plurality of wheel units rotatively decelerates at a rate exceeding a second certain rate relatively low compared to the first said certain rate, and brake control means operative in response to the pick-up of said relay for effecting a continued reduction in the degree of application of the brakes associated with said plurality of wheel units at a relatively rapid rate and operative in response to the restoration of the said relay to its dropped-out position for initiating an increase in the degree of application of the brakes associated with said plurality of wheel units.

4. In a vehicle brake control system, the combination of an electrical relay, means operative in response to the rotative deceleration of any one of a plurality of wheel units of the vehicle at a rate exceeding a certain slipping rate for causing pick-up of said relay, means effective in response to the pick-up of said relay for maintaining it picked-up thereafter as long as any one of said plurality of wheel units rotatively decelerates at a rate exceeding a second certain rate relatively low compared to the first said certain rate, and brake control means operative in response to the pick-up of said relay to initiate a continued reduction in the degree of application of the brakes associated with said plurality of wheel units at a relatively rapid rate and operative in response to the drop-out of said relay to initiate an increase in the degree of application of the brakes associated with said plurality of wheel units at a relatively restricted rate.

5. In a vehicle brake control system, the combination of an electrical relay having a plurality of separate windings, means associated with a plurality of different separately rotating wheel units of the vehicle effective to cause energization of each of said plurality of windings of said relay by a current which is substantially proportional to the rate of rotative deceleration of a corresponding one of said plurality of wheel units, said relay being so constructed and arranged that said relay is not picked-up unless the total ampere-turns of said plurality of windings exceeds a certain value occurring only when one or more of said plurality of wheel units rotatively decelerates at a rate exceeding a certain slipping rate, means effective in response to the pick-up of said relay for maintaining said relay picked-up thereafter for such time as any one of said wheel units rotatively decelerates at a rate exceeding a second certain rate substantially lower than the said certain slipping rate, and brake control means operative while said relay is picked-up for effecting a continuing reduction in the degree of application of the brakes associated with said plurality of wheel units at a relatively rapid rate and effective in response to the drop-out of said relay for initiating an increase in the degree of the brakes associated with said wheel units.

6. In a vehicle brake control system, the combination of an electrical relay having a plurality of separate windings, means associated with a plurality of different separately rotating wheel units of the vehicle effective to cause energization of each of said plurality of windings of said relay by a current which is substantially proportional to the rate of rotative deceleration of a corresponding one of said plurality of wheel units, said relay being so constructed and arranged that said relay is not picked-up unless the total ampere-turns of said plurality of windings exceeds a certain value occurring only when one or more of said plurality of wheel units rotatively decelerates at a rate exceeding a certain slipping rate, means effective in response to the pick-up of said relay for conditioning the relay so that it remains picked-up until the slipping wheel units cease to decelerate at a rate exceeding a second certain rate substantially lower than said first certain rate, and brake control means operative in response to the pick-up of said relay for effecting a continuing reduction in the degree of application of the brakes associated with said plurality of wheel units at a relatively rapid rate and effective in response to the drop-out of said relay for initiating an increase in the degree of application of the brakes associated with said plurality of wheel units.

7. In a vehicle brake control system, the combination of an electrical relay having a plurality of separate windings, means associated with a plurality of different separately rotating wheel units of the vehicle effective to cause energization of each of said plurality of windings of said relay by a current which is substantially proportional to the rate of rotative deceleration of a corresponding one of said plurality of wheel units, said relay being so constructed and arranged that said relay is not picked-up unless the total ampere-turns of said plurality of windings exceeds a certain value occurring only when one or more of said plurality of wheel units rotatively decelerates at a rate exceeding a certain slipping rate, a plurality of resistors, means effective in the dropped-out position of said relay for connecting each of said resistors in shunt relation to a corresponding one of the windings of said relay and effective in response to the pick-up of said relay to disconnect said resistors from shunt relation to said windings, said relay being thereby conditioned in response to the pick-up thereof so that it subsequently drops-out only after the slipping wheel units cease to decelerate at a rate exceeding a second certain rate substantially lower than the first said certain rate, and brake control means operative in response to the pick-up of said relay to initiate a continuing reduction in the degree of application of the brakes associated with said plurality of wheel units at a relatively rapid rate and effective in response to the drop-out of said relay for initiating an increase in the degree of application of the brakes associated with said plurality of wheel units.

8. In a vehicle brake control system, the combination of a relay having a winding, means for causing energization of the winding of the relay to a degree varying substantially in proportion to the rate of rotative deceleration of a wheel unit of the vehicle, means controlling the current energizing the winding of the relay in such a manner that the winding is not energized by a current exceeding a certain value and required to cause pick-up of the relay unless the wheel unit rotatively decelerates at a rate exceeding a first certain rate, said current controlling means being effective in response to the pick-up of the relay for causing an increase in the current energizing the winding of the relay for a given rate of rotative deceleration of the wheel unit whereby said relay is restored to its dropped-out condition only after the wheel unit ceases to decelerate at a rate exceeding a second certain rate substantially lower than the first said certain rate, and brake control means operative in response to pick-up of said relay to effect reduction in the degree of application of the brakes associated with said wheel unit and upon restoration to its dropped-out position to effect an increase in the degree of application of the brakes.

9. In a vehicle brake control system, the combination of an electrical relay having a winding, means for effecting energization of the winding of said relay by a current substantially proportional to the rate of rotative deceleration of a wheel unit of the vehicle, a resistor normally shunting the winding of said relay and so controlling the current in the winding of the relay that the current energizing the winding does not exceed a certain value necessary to cause pick-up of the relay unless the said wheel unit rotatively decelerates at a rate exceeding a first certain rate, means effective in response to pick-up of said relay for removing said resistor from shunt relation with respect to the winding of the relay whereby to cause an increase in the current energizing the winding for a given rate of rotative deceleration of the wheel unit and thereby preventing said relay from being restored to its dropped-out position until the rate of rotative deceleration of the wheel unit reduces below a second certain rate substantially lower than the said first certain rate, and brake control means operative during a brake application to effect a rapid reduction in the degree of application of the brakes associated with the wheel unit in response to the pick-up of said relay and operative to effect an increase in the degree of application of the brakes associated with said wheel unit in response to the restoration of the said relay to its dropped-out position.

10. In a vehicle brake control system, the combination of an electrical relay having a plurality of separate windings, means associated with a plurality of different separately rotating wheel units of the vehicle effective to cause energization of each of said plurality of windings of said relay by a current which is substantially proportional to the rate of rotative deceleration of the corresponding one of said plurality of wheel units, means associated with each winding of said relay effective to so control the current in the winding as to necessitate the rotative deceleration of the corresponding wheel unit at a rate exceeding a first certain rate in order to cause pick-up of said relay and effective in response to pick-up of said relay for so increasing the current in the corresponding winding of the relay as to cause the relay to be maintained picked-up thereafter until the wheel unit ceases to rotatively decelerate at a rate exceeding a second certain rate substantially lower than the said first certain rate, and brake control means operative in response to pick-up of said relay for initiating a reduction in the degree of application of the brakes associated with said plurality of wheel units and operative in response to the drop-out of said relay for initiating an increase in the degree of application of the brakes associated with said plurality of wheel units.

11. In a vehicle brake control system, the combination of an electrical relay having a plurality of separate windings, means associated with a plurality of different separately rotating wheel units of the vehicle effective to cause energization of each of said plurality of windings of said relay by a current which is substantially proportional to the rate of rotative deceleration of the corresponding one of said plurality of wheel units, a plurality of resistors each of which is connected respectively in shunt relation to a corresponding different one of said windings when said relay is dropped-out whereby to so control the current energizing the respective windings as to necessitate the rotative deceleration of one of the wheel units at a rate exceeding a first certain rate in order to cause pick-up of said relay, said resistors being disconnected from shunt relation to the corresponding windings of the relay in response to the pick-up of the relay whereby to so increase the current in the windings for a given rate of rotative deceleration of the corresponding wheel unit as to maintain the relay in its picked-up position until such time as the corresponding wheel units cease to rotatively decelerate at a rate exceeding a second certain rate substantially lower than the said first certain rate, and brake control means operative in response to the pick-up of said relay for initiating a reduction in the degree of application of the brakes associated with said plurality of wheel units and operative in response to the restoration of said relay to its dropped-out position for initiating an increase in the degree of application of the brakes associated with said plurality of wheel units.

DOUGLAS R. BORST.
CLAUDE M. HINES.